United States Patent Office 3,772,282
Patented Nov. 13, 1973

3,772,282
NOVEL 3-INDENECARBOXYLIC ACID-
1-METHINE DERIVATIVES
John A. Ford, Jr., Rochester, N.Y., assignor to Eastman
Kodak Company, Rochester, N.Y.
No Drawing. Continuation-in-part of applications Ser. No.
846,952 and Ser. No. 846,958, both Aug. 1, 1969.
This application Sept. 14, 1970, Ser. No. 72,164
Int. Cl. C07c 69/74; C09b 23/00, 23/14
U.S. Cl. 260—240 R         14 Claims

ABSTRACT OF THE DISCLOSURE

A novel class of 3-indenecarboxylic acid-1-methine compounds are described which can be used to dye textile fibers or to prepare light sensitive polymers.

---

This application is a continuation-in-part of U.S. Ser. No. 846,952 filed Aug. 1, 1969, now U.S. Pat. 3,626,732 issued Dec. 14, 1971, and U.S. Ser. No. 846,958 filed Aug. 1, 1969, now U.S. Pat. 3,694,411 issued Sept. 26, 1972.

This invention relates to novel compounds. In a particular aspect, it relates to a novel class of methine dyes derived from 3-indenecarboxylic acids which can be used to dye textile fibers and fabrics or which can be used to prepare light sensitive polymers.

The novel compounds of this invention are 3-indenecarboxylic acid-1-methine dyes which comprise a first and second nucleus joined to each other by a methine linkage. The first nucleus is a 3-indenecarboxylic acid, or a 3-indenecarboxylic acid derivative joined to the methine linkage at the 1-position of the indene nucleus, and the second nucleus is a substituted benzene or naphthalene group, a heterocyclic group containing 5 or 6 atoms in the hetero nucleus where at least one of the atoms is an oxygen or nitrogen atom, or a benzylidene or furfurylidene group substituted with a 1-indenylidene-3-carboxylic acid moiety, a heterocyclic dye nucleus, or a carboxy or carboxy ester group.

The 3-indenecarboxylic acid-1-methine dyes of this invention can be represented by the structural formula

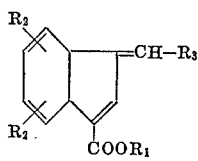

where:

$R_1$ is a hydrogen atom, a lower alkyl group, or an aryl group;
$R_2$ is a hydrogen atom, a lower alkyl group, or a lower alkoxy group; and
$R_3$ is one of the following moieties:
  (1) a substituted benzene or naphthalene group bearing such substituents as nitro groups, chloro groups, hydroxy groups, lower alkyl groups, lower alkoxy groups, or lower dialkylamino groups;
  (2) a heterocyclic group containing 5 or 6 atoms in the hetero nucleus wherein at least one of the atoms is an oxygen or nitrogen atom, the heterocyclic group optionally fused to a carbocyclic ring system and optionally substituted with such substituents as lower alkyl groups, lower alkoxy groups, aryl groups, or 5 or 6 membered heterocyclic groups containing a hetero nitrogen atom; or
  (3) an aromatic group represented by the structure:

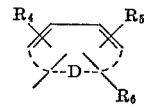

where: D represents the atoms necessary to complete a benzene or a furane nucleus, i.e. D represents a —CH=CH—, or an —O— group; $R_4$ and $R_5$ are each independently a hydrogen atom, a halogen atom, a lower alkyl group, a lower alkoxy group, a lower dialkylamino group or a heterocyclic group containing 5 or 6 atoms in the hetero nucleus at least one of which is a nitrogen atom; and $R_6$ is a 1-methylidyne-3-indencarboxylate group represented by the structural formula:

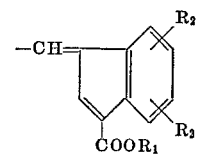

or a group represented by the formula:

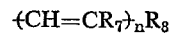

where: $n$ is 0 or 1; $R_1$ and $R_2$ are as defined above; $R_7$ is a hydrogen atom or a cyano group; and $R_8$ is a heterocyclic dye nucleus or a carboxy or carboxy ester group of the formula —COOR$_1$ where $R_1$ is as defined above.

The lower alkyl groups represented by $R_1$, $R_2$, $R_4$, and $R_5$ typically have 1 to 8 carbon atoms such as methyl, ethyl, propyl, butyl, amyl, hexyl, 2-ethylhexyl, etc. The aryl group represented by $R_1$ typically is a benzene group such as phenyl, tolyl, xylyl, etc. The lower alkoxy groups represented by $R_2$, $R_4$ and $R_5$ typically have 1 to 8 carbon atoms such as methoxy, ethoxy, propoxy, butoxy, amyloxy, hexyloxy, heptyloxy, octyloxy, etc. The lower dialkylamino groups represented by $R_4$ and $R_5$ typically contain alkyl groups having 1 to 4 carbon atoms such as methyl, ethyl, n-propyl, n-butyl, etc. Typical of the heterocyclic groups represented by $R_4$ and $R_5$ are pyrrolidino groups, piperidino groups, morpholino groups, etc. Typical of the heterocyclic dye nuclei represented by $R_8$ are the quaternized salts of 5 or 6 membered heterocyclic rings containing oxygen, sulfur, or nitrogen hetero atoms, or combinations of such hetero atoms, the ring optionally being fused to a carbocyclic ring system. Representative heterocyclic dye nuclei are thiazoline, thiazole, benzoxazole, benzothiazole, β-naphthothiazole, dimethylindolenine, quinoline and benzimidazole nuclei.

The 3-indenylidene carboxylic acid-1-methine dyes conveniently can be divided into five groups as follows:

(1) 1-(arylmethylene)-3-indencarboxylates having the structural formula:

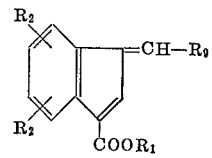

(2) 1-(furfurylidene)-3-indenecarboxylates represented by the structural formula:

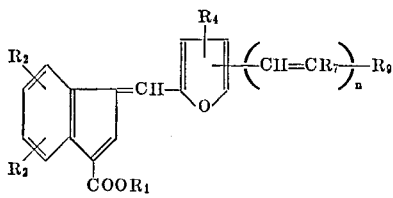

(3) 1-(benzylidene)-3-indenecarboxylates represented by the structural formula:

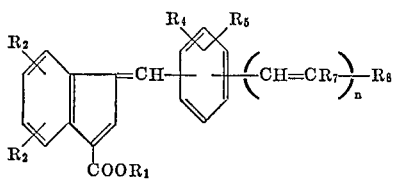

(4) furylenedimethylidyne - 1,1'-bis(3-indenecarboxylates) represented by the structural formula:

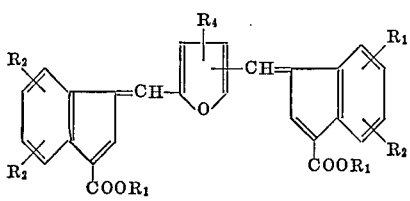

(5) phenylenedimethylidyne - 1,1' - bis(3-indenecarboxylates) represented by the structural formula:

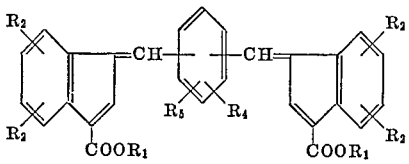

where $n$, $R_1$, $R_2$, $R_4$, $R_5$, $R_6$, $R_7$ and $R_8$ are as defined above and $R_9$ is an aromatic moiety as defined above for R under (1) or (2).

Preferably, $R_1$ is hydrogen or a lower alkyl group particularly methyl, ethyl or 2-ethylhexyl; $R_2$, $R_4$, $R_5$ and $R_7$ are hydrogen; when $R_8$ is a heterocyclic dye nucleus it preferably contains nitrogen oxygen or sulfur hetero atoms, or combinations of such hetero atoms in a 5- or 6-membered ring which is optionally fused to a carbocyclic ring system. Particularly preferred heterocyclic dye nuclei are the thiazolium, benzothiazolium and naphthothiazolium dye salt.

Representative compounds of this invention include: arylenedimethylidyne-1,1'-bis(3-indenecarboxylates) such as:

dimethyl 1,3-phenylenedimethylidyne-1,1'-bis(3-indenecarboxylate),
diethyl 1,4-phenylenedimethylidyne-1,1'-bis(3-indenecarboxylate),
dimethyl 4-dimethylamino-6-methyl-1,3-phenylenedimethylidyne-1,1'-bis(3-indenecarboxylate),
dimethyl 4-dimethylamino-6-methyl-1,3-phenylenedimethylidyne-1,1'-bis(4,7-dimethyl-3-indenecarboxylate),
dimethyl 1,3-phenylenedimethylidyne-1,1'-bis(4,7-dimethyl-3-indenecarboxylate),
dimethyl 1,4-phenylenedimethylidyne-1,1'-bis(4,7-dimethyl-3-indenecarboxylate),
dibutyl 4-pyrrolidino-1,3-phenylenedimethylidyne-1,1'-bis(3-indenecarboxylate),
dimethyl 4,6-dibutoxy-1,3-phenylenedimethylidyne-1,1'-bis(3-indenecarboxylate),
diethyl 3-diethylamino-1,4-phenylenedimethylidyne-1,1'-bis(4,7-diethoxy-3-indenecarboxylate),
dimethyl 2,5-furylenedimethylidyne-1,1'-bis(3-indenecarboxylate),
dimethyl 2,4-furylenedimethylidyne-1,1'-bis(3-indenecarboxylate),
dimethyl 2,5-furylenedimethylidyne-1,1'-bis(4,7-dimethyl-3-indenecarboxylate),
dimethyl 4-dimethylamino-2,5-furylenedimethylidyne-1,1'-bis(4,7-dimethyl-3-indenecarboxylate), and
dimethyl 2,4-furylenedimethylidyne-1,1'-bis(4,7-diethoxy-3-indenecarboxylate); and 1-arylmethylidyne-3-indenecarboxylates such as:

methyl 1-(4-methoxycarbonylbenzylidene)-3-indenecarboxylate,
methyl 1-[4-(2-methoxycarbonylvinyl)benzylidene]-3-indenecarboxylate,
methyl 1-[4-(2-methoxycarbonylvinyl)benzylidene]-4,7-dimethyl-3-indenecarboxylate,
ethyl 1-(3-ethoxycarbonylbenzylidene)-3-indenecarboxylate,
methyl 1-(3-methoxycarbonyl-4-dimethylamino-6-methylbenzylidene)-3-indenecarboxylate,
ethyl 5-(3-methoxycarbonyl-1-indenylidenemethyl)furfurylidene-cyanoacetate,
methyl 1-[5-(2-methoxycarbonylvinyl)furfurylidene]-3-indenecarboxylate,
methyl 4,7-dimethyl-1-[5-(2-carbonylvinyl)furfurylidene]-3-indenecarboxylate;
3-methoxycarbonyl-1-indenylidenemethylbenzoic acid,
3-(2-ethylhexoxycarbonyl)-1-indenylidenemethylbenzoic acid,
3-cyano-1-indenylidenemethylbenzoic acid,
3-methoxycarbonyl-1-indenylidenemethylcinnamic acid,
3-(2-ethylhexoxycarbonyl)-1-indenylidenemethylcinnamic acid,
3-cyano-1-indenylidenemethylcinnamic acid,
p-[4,7-dimethyl-3-(2-ethylhexoxycarbonyl)-1-idenylidenemethyl]-benzoic acid,
p-(4,7-dimethyl-3-methoxycarbonyl-1-idenylidenemethyl)cinnamic acid,
p-(5,6-dimethoxy-3-methoxycarbonyl-1-idenylidenemethyl)benzoic acid,
1-p-nitrobenzylidene-3-indenecarboxylic acid,
1-p-chlorobenzylidene-3-indenecarboxylic acid,
1-p-methoxybenzylidene-3-indenecarboxylic acid,
1-p-ethoxycarbonylbenzylidene-3-indenecarboxylic acid,
1-p-(2-ethylhexoxy)benzylidene-3-indenecarboxylic acid,
1-[5-(3-methoxycarbonyl-1-indenylidenemethyl)furfurylidene]-3-indenecarboxylic acid,
4,7-dimethyl-1-p-isopropylbenzylidene-3-indenecarboxylic acid,
4,7-diethyl-1-p-methoxybenzylidene-3-indenecarboxylic acid and
5,6-dimethoxy-1-p-(2-ethylhexoxycarbonyl)benzylidene-3-indenecarboxylic acid.

The compounds of this invention can be prepared by reacting a 3-indenecarboxylic acid with an appropriate aromatic aldehyde. The reaction is typically carried out in aromatic hydrocarbon solvents such as toluene in the presence of an amine salt such as piperidine acetate at elevated temperatures. Alternatively, the reaction can be performed in the presence of an alkali metal alkoxide such as sodium or potassium methoxide. The bis compounds can be prepared by using a bisaldehyde or by condensation of the indenecarboxylic acid with a monoaldehyde followed by formylation of the resulting product to give an aldehyde which is then further condensed with an additional amount of the indenecarboxylic acid, if a symmetrical compound is desired, or with another reactant if a non-symmetrical compound is to be made.

Suitable aromatic aldehydes include benzaldehyde, substituted benzaldehydes such as p-nitrobenzaldehyde, p- anisaldehyde, p-carboxybenzaldehydes, p-isopropylbenzaldehyde, o-chlorobenzaldehyde, 2,4 - dichlorobenzaldehyde, p-diethylaminobenzaldehyde, 2,4-dichlorohydroxybenzaldehyde and 2,5 - dimethoxybenzaldehyde; naphthaldehyde, substituted naphthaldehydes such as 2-hydroxy-1 - naphthaldehyde; p-formylcinnamic acid; bisaldehydes such as terephthalaldehyde, isophthalaldehyde and 4-dimethylamino-6 - methylisophthalaldehyde; heterocyclic aldehydes such as 2 - furaldehyde, pyrrole-2-carboxaldehyde, 2,5-dimethyl-1-(3-pyridyl) - 3 - pyrrolecarboxaldehyde, indole-3-carboxaldehyde, and 2 - methylene-1,3,3-trimethylindoline-ω-carboxaldehyde, and the like.

Suitable indene carboxylic acids for use in this invention can be prepared by procedures known in the art such as are described in Crowell & Capps, Journal of the American Chemical Society 74, 4448 (1952).

The following examples further illustrate the invention.

EXAMPLE 1

3-indenecarboxylic acid

To a solution of 43.4 g. (0.375 mole) of indene in 300 ml. of ether is added dropwise with stirring at —30° C. under nitrogen a solution of n-butyllithium from 8.6 g. of lithium and 68.5 g. of 1-bromobutane (made by the procedure described in Gilman, Organic Reactions, vol. VI, p. 352). The mixture is stirred for 10 minutes after completion of the addition and then poured onto 400 g. of crushed Dry Ice under 200 ml. of ether. The mixture is warmed to 5° C. on a steam bath and extracted with two 250 ml. portions of water. Acidification of the combined aqueous portions, collection of the solid, and recrystallization from 62.1 g. of benzene gives 41.2 g. (68.6 percent) of pale yellow crystals, M.P. 157–160° C.

*Analysis.*—Calcd. for $C_{12}H_{12}O_2$ (percent): C, 76.6; H, 6.38. Found (percent): C, 76.0; H, 6.6.

EXAMPLE 2

4,7-dimethyl-3-indenecarboxylic acid

This compound is prepared as in Example 1 substituting an equivalent molar amount of 4,7 dimethylidene for the indene.

EXAMPLE 3

2-ethylhexyl 3-indenecarboxylate

A solution of 200 g. (1.25 mole) or 3-indenecarboxylic acid, 2 liters of 2-ethyl-1-hexanol, and 5 g. of p-toluenesulfonic acid is distilled slowly through a 6-inch column packed with ¼-inch glass helices for 5 hours, refluxed overnight, and then distilled for 4 more hours. During this time the pot temperature rises from 160 to 190° C.; and 26 ml. of water is distilled off. The mixture is concentrated at the water pump and the residue dissolved in 1 liter of petroleum ether (B.P. 35–60° C.) and allowed to stand overnight. The filtered solution is washed with 500 ml. of water, 200 ml. of saturated aqueous sodium bicarbonate, and again with 500 ml. of water. Drying over anhydrous sodium sulfate, concentration at the water pump and fractionation of the residue gives 12.2 g. of forerun, B.P. 128–181° C. (1 mm.), 143 g. of pale yellow oil, B.P. 165–166° C. (1 mm.), $n_D^{20}$ 1.5195 and 64.5 g. B.P. 165–169° C. (1 mm.) $n_D^{21.5}$ 1.5186. The yield of 207.5 g. is 61.0 percent of the theoretical quantity.

*Analysis.*—Calcd. for $C_{18}H_{24}O_2$ (percent): C, 79.4; H, 8.83. Found (percent): C, 79.4; H, 8.4.

EXAMPLE 4

Methyl 4,7-dimethyl-3-indenecarboxylate

A solution of 100 g. (0.532 mole) of 4,7-dimethyl-3-indenecarboxylic acid, 2 liters of methanol and 4 g. of p-toluenesulfonic acid is refluxed overnight, concentrated at the water pump, and then diluted with 500 ml. of ligroine (B.P. 35–60° C.) and chilled. After filtration from a trace of solid the solution is washed with 100 ml. of water, 100 ml. of 9 percent aqueous sodium bicarbonate, and then 100 ml. of water, dried with anhydrous sodium sulfate, and concentrated on a steam bath. Distillation of the residue gives 65.3 g. (60.8 percent) of yellow oil, B.P. 165–174° C. (10 mm.), $n_D^{26}$ 1.5506.

*Analysis.*—Calcd. for $C_{13}H_{14}O_2$ (percent): C, 77.2; H, 6.9. Found (percent): C, 76.9; H, 6.9.

The following Examples 5–18 describe the preparation of compounds having the following generalized structure by the reaction of a 3-indenecarboxylic acid with an appropriate aldehyde:

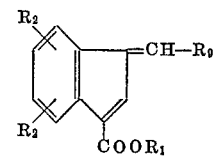

EXAMPLE 5

1-p-nitrobenzylidene-3-indenecarboxylic acid

A mixture of 40.0 g. (0.25 mole) of 3-indeneacorboxylic acid, 36.3 g. (0.25 mole) of p-nitrobenzaldehyde, 250 ml. of toluene, 1 ml. of piperidine, and 1 ml. of glacial acetic acid is refluxed for 2 hours with stirring and azeotropic removal of water and then cooled overnight in the refrigerator. The solid which crystallizes out of the reaction mixture on cooling is collected, washed with toluene, and dried and recrystallized from dioxane to give 41 g. (57 percent) of orange crystals, M.P. 281–282° C.

EXAMPLE 6

1-p-methoxybenzylidene-3-indene carboxylic acid

A solution of 40 g. (0.25 mole) of 3-indenecarboxylic acid and 35 g. (0.26 mole) of p-anisaldehyde in 320 ml. of methanol is treated with 110 ml. of 30 percent potassium hydroxide in methanol. The mixture is allowed to stand overnight in a cold water bath and then is added to 500 ml. of water. Extraction of this mixture with ether, acidification of the aqueous phase, collection of the solid washing with water, and drying at 60° C. gives 61 g. of product, M.P. 198–200° C. Recrystallization from chlorobenzene gives 41 g. (59 percent) of yellow crystals, M.P. 222° C.

EXAMPLE 7

2,5-dihydroxybenzylidene-3-indenecarboxylic acid

This compound is prepared using the procedure of Example 5 substituting an appropriate amount of 2,5-dihydroxybenzaldehyde for the p-nitro benzaldehyde.

EXAMPLE 8

4,7-dimethyl-1-p-isopropylbenzylidene-3-indenecarboxylic acid

The procedure of Example 5 is followed using 29.0 g. (0.154 mole) of 4,7-dimethyl-3-indenecarboxylic acid, 22.8 g. (0.154 mole) of p-isopropylbenzaldehyde, 200 ml. of toluene, 1 ml. of piperidine, and 1 ml. of glacial acetic acid. Concentration at the water pump and recrystallization of the residue from benzene gives 11.7 g. (23.9 percent) of orange crystals, M.P. 185–187° C.

*Analysis.*—Calcd. for $C_{22}H_{22}O_2$ (percent): C, 82.9; H, 6.9. Found (percent): C, 82.8; H, 6.6.

EXAMPLE 9

5,6-dimethoxy-1-p-isopropylbenzylidene-3-indenecarboxylic acid

This compound is prepared as in Example 8 substituting an appropriate amount of 5,6-dimethoxy-3-indenecarboxylic acid for the 4,7-dimethyl-3-indenecarboxylic acid.

EXAMPLE 10

1-[2,5-dimethyl-1-(3-pyridyl)-3-pyrrylmethylene]-3-indenecarboxylic acid

A mixture of 25.0 g. (0.125 mole) of 2,5-dimethyl-1-(3 - pyridyl) - 3 - pyrrolecarboxaldehyde, 20.1 g. (0.125 mole) of 3-indenecarboxylic acid, 250 ml. of toluene, 1 ml. of piperidine and 1 ml. of glacial acetic acid is refluxed for 4 hours with stirring and azeotropic removal of 2.3 ml. of water. The solid which separates upon cooling to room temperature is collected, washed with toluene, and dried to give 39.0 g. of orange crystals, M.P. 260–263° C. Recrystallization from 400 ml. of dioxane gives 21.6 g. (50.5%), M.P. 255–256° C.

*Analysis.*—Calcd. for $C_{22}H_{18}N_2O_2$ (percent): C, 77.1; H, 5.26; N, 8.19. Found (percent): C, 76.8; H, 5.2; N, 8.1.

EXAMPLE 11

2-[2-(3-methoxycarbonylinden-1-ylidene)ethylidene]-1,3,3-trimethylindoline

A solution of 17.4 g. (0.100 mole) of methyl 3-indenecarboxylate, 20.1 g. (0.100 mole) of 2-methylene-1,3,3-trimethylindoline-ω-carboxaldehyde, 150 ml. of toluene, 1 ml. of piperidine, and 1 ml. of glacial acetic acid is refluxed for 2 hours with stirring and azeotropic removal of 2.0 ml. of water and then cooled to room temperature. The solid is collected, washed with toluene and with ligroine (B.P. 63–75° C.) and dried to give 20.7 g. of red-violet crystals, M.P. 194–194.5° C. Recrystallization from 200 ml. of toluene gives 17.9 g. (50.1%), M.P. 193–194° C.

*Analysis.*—Calcd. for $C_{24}H_{23}NO_2$ (percent): C, 80.6; H, 6.44; N, 3.92. Found (percent): C, 81.0; H, 6.6; N, 3.9.

EXAMPLES 12–17

Following the procedure of Example 5 and using appropriate aldehydes and 3-indenecarboxylic acids, compounds are prepared wherein $R_1$, $R_2$ and $R_9$ are as follows:

The following Examples 19–26 illustrate the preparation of compounds having the following generalized structural formula and of intermediates for use in preparing the compounds.

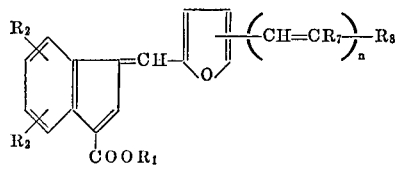

EXAMPLE 19

1-furfurylidene-3-indenecarboxylic acid

A mixture of 32.0 g. (0.200 mole) of 3-indenecarboxylic acid, 19.2 g. (0.200 mole) of 2-furaldehyde, 200 ml. of toluene, 1 ml. of glacial acetic acid, and 1 ml. of piperidine is refluxed for 3 hours with stirring and azeotropic removal of 3.0 ml. of water. The solid which separates upon cooling to room temperature is recrystallized from 250 ml. of dioxane to give 23.7 g. (49.8 percent) of orange crystals, M.P. 246–254° C.

*Analysis.*—Calcd. for $C_{15}H_{10}O_3$ (percent): C, 75.6; H, 4.20. Found (percent): C, 75.3; H, 4.4.

Similar treatment of 29.2 g. (0.304 mole) of 2-furaldehyde with 52.8 g. (0.304 mole) of methyl 3-indenecarboxylate gives after 3 recrystallizations from methanol 50.4 g. (65.8 percent) of orange crystalline methyl 1-furfurylidene-3-indenecarboxylate, M.P. 98.5–100° C.

*Analysis.*—Calcd. for $C_{16}H_{12}O_3$ (percent): C, 76.2; H, 4.76. Found (percent): C, 75.9; H, 5.0.

EXAMPLE 20

Methyl 1-(5-formylfurfurylidene)-3-indenecarboxylate

To 100 ml. of dimethylformamide is added, with stirring and cooling to keep the temperature below 30° C., 7.7 g. (0.050 mole) of phosphoryl chloride followed by 12.6 g. (0.0500 mole) of methyl 1-furfurylidene-3-indenecarboxylate. The mixture is stirred for 1 hour without heating and then for 1 hour at 70° C., chilled in ice, and made basic by slow addition of 2 N potassium hydroxide. The solid is collected, washed with water, and recrystallized 4 times from acetonitrile to give 4.6 g. (33 percent) or orange crystals, M.P. 157–158.5° C.

| Example | $R_1$ | $R_2$ | $R_9$ |
| --- | --- | --- | --- |
| 12 | $-C_2H_5$ | $-H$ | 4-chlorophenyl |
| 13 | $-CH_3$ | $-H$ | 4-$N(C_2H_5)_2$-phenyl |
| 14 | $-H$ | $-H$ | 2-naphthyl |
| 15 | $-H$ | $-H$ | 2-hydroxy-1-naphthyl |
| 16 | $-CH_3$ | 4,7-$CH_3$ | pyrryl |
| 17 | $-CH_2-CHC_2H_5$ (with $C_4H_9$) | 5,6-$OCH_3$ | 4-$NO_2$-phenyl |
| 18 | phenyl | $-H$ | 4-$CH_3$-phenyl |

*Analysis.*—Calcd. for $C_{17}H_{12}O_4$ (percent): C, 72.7; H, 4.28. Found (percent): C, 72.9; H, 4.2.

When the reaction is run as described above in Example 20 with twice the amount of material, and the potassium hydroxide treatment is omitted, a red-brown crystalline solid separates after stirring overnight at room temperature. It is collected, washed with ether, and air dried to give 25.4 g. which liquifies at 100° C., resolidifies, and melts at 151–155° C. This Vilsmeier product can be condensed with active methylene compounds to give products identical with those from 1-(5-formylfurfurylidene)-3-indenecarboxylate and in some instances it may be preferred since it is not necessary to purify the intermediates.

EXAMPLE 21

Ethyl 5-(3-methoxycarbonyl-1-indenylidenemethyl)-furfurylidenecyanoacetate (A) From methyl 1-(5-formylfurfurylidene)-3-indenecarboxylate:

A mixture of 14.1 g. (0.0504 mole) of methyl 1-(5-formylfurylidene)-3-indenecarboxylate, 5.7 g. (0.050 mole) of ethyl cyanoacetate, 200 ml. of toluene, 1 ml. of piperidine, and 1 ml. of glacial acetic acid is refluxed for 4 hours with stirring and azeotropic removal of 1.9 ml. of water. The product which separates upon cooling to room temperature is collected and recrystallized from 110 ml. of toluene to give 13.1 g. (69.2 percent), M.P. 164–165° C., $\lambda_{max.}^{DCE}$ (log $\epsilon$) 272(4.24), 333(3.63), 450(4.63), 475(4.62).

*Analysis.*—Calcd. for $C_{22}H_{17}NO_5$ (percent): C, 70.6; H, 4.53; N, 3.73. Found (percent): C, 70.5; H, 4.8; N, 3.7.

(B) From the Vilsmeier Product from Example 20:

To a solution of 2.5 g. (0.022 mole) of ethyl cyanoacetate in 100 ml. of 3A alcohol is added 7.7 g. of the Vilsmeier product from Example 20 and then 1 ml. of piperidine. The solution is refluxed for 4 hours and then allowed to stand overnight at room temperature. The solid which has separated is collected and dried to give 6.7 g. of orange-brown crystals, M.P. and M.M.P. with "A" above 162–165° C. Recrystallization from 50 ml. of toluene gives 5.8 g. (70 percent), M.P. 165–166.5° C.

EXAMPLE 22

2-{2-[2-(3-methoxycarbonyl-1-indentylidenemethyl)-fur-5-yl]ethylidene}-3-ethylbenzothiazolium iodide A mixture of 22.3 g. (0.0730 mole) of 3-ethyl-2-methylbenzothiazolium iodide, 25.0 g. of the Vilsmeier product from Example 20, and 200 ml. of methanol is treated with 1.5 ml. of piperidine, refluxed for 5 minutes, and allowed to sand overnight at room temperature. The separated solid is collected, washed with methanol, and dried to give 30.7 g., M.P. 220–223° C. Recrystallization from 200 ml. of pyridine gives 6.6 g. (16 percent), M.P. 222–224° C., $\lambda_{max.}^{DCE}$ (log $\epsilon$) 372 (4.66), 418 (4.70), 533 (4.70).

*Analysis.*—Calcd. for $C_{27}H_{22}INO_3S$ (percent): C, 57.2; H, 3.87; I, 22.4; N, 2.4. Found (percent): C, 57.8; H, 4.0; I, 21.4; N, 2.4.

EXAMPLES 23–26

Following the procedure of Example 22 and using suitable 3-indenecarboxylates and aldehydes that are prepared compounds wherein $R_1$, $R_2$, $R_7$ and $R_8$ are as follows:

| Example | $R_1$ | $R_2$ | $R_7$ | $R_8$ | $n$ |
|---|---|---|---|---|---|
| 23 | H | 4.7-$CH_3$ | | —COOH | 0 |
| 24 | —H | —H | —H | benzothiazolium-N-$CH_3$ $I^\ominus$ | 1 |
| 25 | —H | 4.7-$CH_3$ | —H | —COOH | 1 |
| 26 | —H | —H | —H | benzimidazolium N,N-$CH_3$ $I^\ominus$ | 1 |

The following Examples 27–38 illustrate the preparation of compounds having the following generalized structure:

$$R_1, R_2\text{-indene}=CH-\text{phenyl}-(CH=CR_7)_n-R_8$$
$$COOR_1$$

EXAMPLE 27

Methyl 1-p-carboxybenzylidene-3-indenecarboxylate

A mixture of 10.7 g. (0.0713 mole) of p-carboxybenzaldehyde, 12.4 g. (0.0713 mole) methyl 3-indenecarboxylate, 1 ml. of piperidine, 1 ml. of glacial acetic acid, and 150 ml. of toluene is refluxed for 2 hours with stirring and azeotropic removal of water. The mixture is cooled overnight in the refrigerator and the solid collected, washed with toluene, and dried at 60° C. to give 19.0 g. of orange crystals, M.P. 250° C. Recrystallization from 350 ml. of dioxane gives 14.2 g. (65.0 percent), M.P. 274–276° C.

*Analysis.*—Calcd. for $C_{19}H_{14}O_4$ (percent): C, 74.5; H, 4.57. Found (percent): C, 74.8; H, 4.7.

EXAMPLE 28

Methyl 1-(p-methoxycarbonylbenzylidene)-3-indenecarboxylate

A solution in 1500 ml. of methanol of the crude methyl 1-(p-carboxybenzylidene)-3-indenecarboxylate prepared in Example 27 is saturated with hydrogen chloride gas and stirred overnight at reflux. The mixture is cooled, the solid collected by filtration, washed with methanol, and dried to yield 36.9 g. of product, M.P. 152–6° C. The crude material is recrystallized twice from toluene to yield 33 g. of orange crystals melting at 153–156° C.

*Analysis.*—Calcd. for $C_{20}H_{16}O_4$ (percent): C, 75.0; H, 5.0. Found (percent): C, 75.5; H, 5.4.

EXAMPLE 29 p-(4,7-dimethyl-3-methoxycarbonyl-1-indenylidenemethyl)cinnamic acid

A mixture of 45.8 g. (0.227 mole) of 4,7-dimethyl-3-methoxycarbonylindene, 40.0 g. (0.227 mole) of p-formylcinnamic acid, 1 ml. of glacial acetic acid, 1 ml. of piperidine, and 500 ml. of toluene is refluxed for 2 hours in a flask fitted with a Dean-Stark moisture trap, and then is allowed to stand for about 16 hours. A total of 2.8 ml. of water is collected. The solid is collected by filtration and recrystallized from 400 ml. of glacial acetic acid to yield 37.7 g. of p-(4,7-dimethyl-3-methoxycarbonyl-1-indenylidenemethyl)cinnamic acid melting at 185–188° C.

EXAMPLE 30

Methyl p-(4,7-dimethyl-3-methoxycarbonyl-1-indenylidenemethyl)cinnamate

A mixture of 16.8 g. (0.0466 mole) of the acid prepared in Example 29 above, 500 ml. of methanol, 1 g. p-toluenesulfonic acid, and 2.5 g. of a mixture of the above acid and its acid chloride is stirred at reflux for 24 hours, gravity filtered, and allowed to cool to room temperature. The precipitated product is collected by filtration, washed with methanol and dried to yield 10.7 g. of yellow solid melting at 107–117° C. A second crop is obtained by concentrating the mother liquors. The combined crops are recrystallized first from 500 ml. of cyclohexane, and then from 250 ml. of ethanol to provide 8.8 g. of product melting at 123–124° C.

Analysis.—Calcd. for $C_{24}H_{20}O_4$ (percent): C, 77.0; H, 5.9. Found (percent): C, 76.7; H, 6.2.

EXAMPLE 31

2 - {2 - [3 - (3 - methoxycarbonylinden-1-yliden)-4-methyl-6 - diethylaminophenyl]vinyl} - 1 - ethylbenzothiazolium iodide Methyl 1-(4-diethylamino - 2 - methylbenzylidene)-3-indenecarboxylate is prepared by the procedure of Example 27 using appropriate amounts of methyl 3-indenecarboxylate and 4-diethylamino 2-methylbenzaldehyde. This product is formylated with phosphoryl chloride in the presence of dimethyl formamide with stirring for one hour without heat following by stirring for one hour at 70° C. and the product is separated by chilling in ice and addition of 2 N potassium hydroxide. This formylated compound is collected, washed with water and recrystallized from acetonitrile after which it is converted to the dye product by reaction with 3-ethyl 2-methylbenzothiazolium iodide in methanol in the presence of piperidine as a catalyst.

EXAMPLES 32–38

Using the procedure of the appropriate one of the above examples and suitable reactants, compounds of this invention are prepared wherein $R_1$, $R_2$, $R_4$, $R_5$, $R_7$ and $R_8$ are as follows:

| Example | $R_1$ | $R_2$ | $R_4$ | $R_5$ | $R_7$ | $R_8$ | n |
|---|---|---|---|---|---|---|---|
| 32 | —CH$_2$—CHC$_2$H$_5$ \| C$_4$H$_9$ | —H | —H | —H | —H | —COOH | 1 |
| 33 | —H | 5,6-OCH$_3$ | —H | —H | —H | —COOCH$_3$ | 1 |
| 34 | —CH$_3$ | —H | —N(CH$_3$)$_2$ | —H | —H | —COOH | 1 |
| 35 | —CH$_3$ | —H | —C$_2$H$_5$ | —C$_2$H$_5$ |  | —COOH | 0 |
| 36 | —H | 4,7-CH$_3$ | —H | —H | —CN | —COOCH$_3$ | 1 |
| 37 | —H | —H | —H | —H | —H | 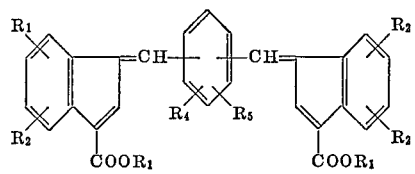 | 1 |
| 38 | —H | —H | (pyrrole) | —H | —H | (benzoxazolium) | 1 |

The following Examples 39–43 illustrate the preparation of compounds of this invention having the following generalized formula:

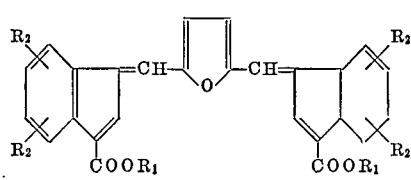

EXAMPLE 39

Methyl 1-[5-(3-carboxy-1-indenylidenemethyl)furfurylidene]-3-indenecarboxylate

A mixture of 25.0 g. of the Vilsmeier product of Example 20, 11.6 g. (0.0728 mole) of 3-indenecarboxylic acid, and 200 ml. of methanol is warmed until solution results, treated with 1 ml. of piperidine, and allowed to stand for 72 hours. The solid is collected, washed with methanol, and recrystallized twice from dioxane to give 11.9 g. (39.8 percent) of brown crystals, M.P. 272.5–273.5° C.

Analysis.—Calcd. for $C_{26}H_{18}O_5$ (percent): C, 75.2, H, 4.38. Found (percent): C, 76.8; H, 4.6.

EXAMPLES 40–43

By substituting appropriate 3-indenecarboxylic acids in the procedure of Example 39, there are prepared compounds of this invention wherein $R_1$ and $R_2$ are as follows:

| Example | $R_1$ | $R_2$ |
|---|---|---|
| 40 | —H | —H |
| 41 | —CH$_3$ | 4,7—CH$_3$ |
| 42 | —CH$_3$ | 5,6—OCH$_3$ |
| 43 | —CH$_2$—CH—C$_2$H$_5$ \| C$_4$H$_9$ | —H |

The following Examples 44–51 illustrate the preparation of compounds having the following generalized structure wherein a suitable 3-indenecarboxylic acid is reacted with an appropriate bisaldehyde

EXAMPLE 44

Dimethyl 4-dimethylamino-6-methyl-1,3-phenylene-dimethylidyne-1,1′-bis(3-indenecarboxylate)

A solution of 19.1 g. (0.100 mole) of 6-dimethylamino-4-methylisophthaldehyde, 34.8 g. (0.200 mole) of methyl 3-indenecarboxylate, 200 ml. of toluene, 1 ml. of piperidine, and 1 ml. of glacial acetic acid is refluxed for 2 hours with stirring and azeotropic removal of 3.6 ml. of water. The orange-red solution is cooled to room temperature and poured into 1 liter of ligroine (B.P. 63–75° C.). The resulting two-phase liquid is allowed to stand for 4 hours with occasional manual stirring. The lower layer is separated, boiled with 1 liter of acetonitrile and cooled overnight in the refrigerator. The product is collected, washed with acetonitrile and dried to give 18.2 g. of orange-red crystals, M.P. 197–200° C. Evaporation of the upper layer from the reaction mixture in the hood at room temperature gives a mixture of brown tar and orange-red crystals. Recrystallization using the acetonitrile filtrate from the first crop gives 15.1 g. of product, M.P. 198.5–201.5° C. The two crops are combined and recrystallized from 1.5 l. of acetonitrile to give 29.7 g. of orange-red crystals (59 percent) M.P. 199–201° C.

*Analysis.*—Calcd. for $C_{33}H_{29}NO_4$ (percent): C, 78.7; H, 5.76; N, 2.79. Found (percent): C, 78.9; H, 5.8; N, 3.0.

EXAMPLE 45

Dimethyl 1,3-phenylenedimethylidyne-1,1′-bis-(4,7-dimethyl-3-indenecarboxylate)

A solution of 44 g. (0.22 mole) methyl 4,7-dimethyl-3-indenecarboxylate, 13.4 g. (0.100 mole) isophthaldehyde and 200 ml. benzene is treated with 1 ml. of glacial acetic acid and 1 ml. piperidine and heated overnight under a moisture trap to collect 3.5 ml. of water. The mixture is concentrated under vacuum to yield a yellow solid residue. The residue is recrystallized once from 350 ml. of ethyl acetate, and a second time from 200 ml. of ethyl acetate. Yield 37.6 g. of yellow solid melting at 136–138.5° C.

*Analysis.*—Calcd. for $C_{34}H_{30}O_4$ (percent): C, 81.3; H, 5.98. Found (percent): C, 80.9; H, 6.2.

EXAMPLE 46

Preparation of dimethyl 4-dimethylamino-6-methyl 1,3-phenylenedimethylidyne - 1,1′ - bis(4,7 - dimethyl-3-indenecarboxylate)

A mixture of 21.9 g. (0.108 mole) methyl 4,7-dimethyl-3-indenecarboxylate, 10.8 g. (0.054 mole) 4-dimethylamino-6-methylisophthalaldehyde, 100 ml. benzene, 1 ml. glacial acetic acid and 1 ml. piperidine is refluxed for about 16 hours, in a flask fitted with a moisture trap. The reaction mixture is cooled to room temperature and the orange-red product is separated by filtration, washed with 200 ml. of ligroine, and dried to yield 29 g. The crude material is recrystallized 3 times from 150 ml. portions of toluene to provide 23 g. of product melting at 214–216° C.

*Analysis.*—Calcd. for $C_{37}H_{37}NO_4$ (percent): C, 79.5; H, 6.6; N, 2.5. Found (percent): C, 79.5; H, 6.7; N, 2.4.

EXAMPLE 47

Dimethyl 1,4-phenylenedimethylidyne-1,1′-bis(3-indenecarboxylate)

A mixture of 13.4 g. (0.100 mole) of terphthaldehyde, 34.8 (0.200 mole) of methyl 3-indenecarboxylate, 400 ml. of toluene, 1 ml. of piperidine, and 1 ml. of glacial acetic acid is refluxed for 3 hours with stirring and azeotropic removal of 3.5 ml. of water. The mixture is cooled to room temperature, and the solid is collected to give 40.5 g. of orange crystals, M.P. 223.5–225° C. Recrystallization from 800 ml. of dioxane gives 37.8 g. (84.8%), M.P. 224–225° C.

*Analysis.*—Calcd. for $C_{30}H_{22}O_4$ (percent): C, 80.8; H, 4.93. Found (percent): C, 80.4; H, 5.1.

EXAMPLE 48

Dimethyl 1,3-phenylenedimethylidyne-1,1′-bis(3-indenecarboxylate)

A mixture of 13.1 g. (0.0978 mole) of isophthalaldehyde, 34.8 g. (0.200 mole) of methyl 3-indenecarboxylate, 200 ml. of toluene, 1 ml. of glacial acetic acid, and 1 ml. of piperidine is reacted by the procedure described in Example 15 and then cooled overnight in the refrigerator. The solid is collected and recrystallized first from acetonitrile and then from toluene to give 26.3 g. (60.3%) of orange crystals, M.P. 183–185° C.

*Analysis.*—Calcd. for $C_{30}H_{22}O_4$ (percent): C, 80.8; H, 4.93. Found (percent): C, 80.6; H, 5.2.

EXAMPLES 49–51

Following the above procedure using appropriate indenecarboxylates and dialdehydes, compounds are prepared wherein $R_1$, $R_2$, $R_4$ and $R_5$ are as follows:

| Example | $R_1$ | $R_2$ | $R_4$ | $R_5$ |
| --- | --- | --- | --- | --- |
| 49 | —H | 4,7-$CH_3$ | —$CH_3$ | —$CH_3$ |
| 50 | —$CH_2$—CH—$C_2H_5$ $\vert$ $C_4H_9$ | —H | —H | —H |
| 51 | —$CH_3$ | 5,6-O$CH_3$ | —H | —H |

The nonquaternized compounds of the invention can be used for dyeing linear polyester textile materials in the manner described in U.S. Patents 2,880,050, 2,757,064, 2,782,187 and 3,043,827. These novel compounds are water-insoluble, i.e. substantially water-insoluble, and therefore they can be applied to polyester fibers according to conventional disperse dyeing techniques. The following Example 52 illustrates a carrier dyeing procedure for applying these 3-indenecarboxylic acid-1-methine compounds of the invention to dye polyester textile materials.

EXAMPLE 52

An amount of 0.1 g. of the compound is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic surfactant solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 120° C. and heat set (for the removal of residual carrier) for 5 minutes at 350° C.

The compounds of the invention can also be applied to polyester textile materials by the heat fixation technique described in U.S. Pat. 2,663,612 and in the American Dye-Stuff Reporter, 42, 1 (1953). The following procedure describes how the 3-indenecarboxylic acid-1-methine compounds of the invention can be applied to polyester materials by the heat fixation technique.

EXAMPLE 53

A mixture of 500 mg. of the dye compound, 150 mg. of a sodium lignosulfonate dispersing agent (Maraperse N), 150 mg. of a partially desulfonated sodium lignosulfonate (Maraperse CB), 0.5 ml. glycerin, and 1.0 ml. of water is ground in a microsize container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring. A thickener and penetrating mixture is prepared by mixing:

1 ml. of a complex diaryl sulfonate surfactant, (compound 8-S), 3 ml. of a 3% solution of sodium N-methyl-N-oleoyl taurate, 8 ml. of a 25% solution of natural gums (Super-clear 8ON), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C. 10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics. The padded fabrics are then dried at 95° C. and then heat-fixed for 2 minutes at 215° C. in a forced air oven. The dyed fabrics are scoured for 20 minutes at 65–70° C. in a solution containing 0.2% sodium hydrosulfite, 0.2% sodium carbonate and 1.7% of a 3% solution of sodium N - methyl - N - oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,466. Poly(ethylene terephthalate) polyester fibers are described, for example, in U.S. Pat. 2,465,319. The polymeric linear polyester materials disclosed in U.S. Pats. 2,945,010, 2,957,745, and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of solution employing a solvent mixture consisting of 60% phenol and 40% tetrachloroethane. The polyester fabrics, yarns, fibers and filaments that are dyed with the novel compounds of this invention can also contain minor amounts of other additives such as brighteners, pigments, delusterants, inhibitors, stabilizers, etc. Although the nonquaternized compounds of the invention are particularly suitable for dyeing polyester textile materials, these compounds can also be used to dye other synthetic, hydrophobic textile materials such as cellulose acetate, modified polypropylene, polyamide, modacrylic, etc. fibers.

The quaternized compounds of the invention can be used for dyeing acrylic and modacrylic polymer fibers, yarns and fabrics giving yellow shades when applied thereto by conventional dye methods. Acrylic textile materials are those which consist of at least 85% acrylonitrile and modacrylic textile materials are those consisting of at least 35% by less than 85% acrylonitrile. The compounds of the invention also give excellent dyeings on acid-modified acrylic fibers described in U.S. Pats. 2,837,500, 2,837,501 and 3,043,811. The novel compounds can also be used to dye sulfonate modified polyester fibers such as are described in U.S. Pat. 3,018,272. Examples of the textile materials that are dyed with the compounds of the invention are those sold under the tradenames "Orlon," "Orlon 42," "Verel," "Acrilan," "Dynel," and "Creslan."

Such textile materials dyed by the quaternized compounds of the invention are characterized by containing at least about 35% combined acrylonitrile units and up to about 95% acrylonitrile units, and modified, for example, by 65–5% of vinyl pyridine units as described in U.S. Pats. 2,990,393 (Re. 25,533) and 3,014,008 (Re. 25,539) or modified by 65–5% of vinylpyrrolidone units, for example, as described by U.S. Pat. 2,970,783, or modified with 65–5% acrylic ester or acrylamide units as described in U.S. Pats. 2,879,253, 2,879,254 and 2,838,470. Similar amounts of the other polymeric modifiers mentioned above are also useful. A preferred group of the copolymers readily dyeable with the quaternized dyes of the invention are the modacrylic polymers such as described in U.S. Pat. 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

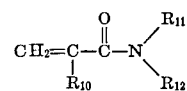

wherein $R_{10}$ is selected from the group consisting of hydrogen and methyl, and $R_{11}$ and $_{12}$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

Another type of modacrylic polymer that can be dyed with the quaternized compounds of the invention is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R_{10}$, $R_{11}$ and $R_{12}$ are as described above. Specific polymers of that type contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methylacrylamide, poly-N-isopropylacrylamide and poly-N-tertiarybutylacrylamide.

The following example illustrates one way in which the compounds of the inevntion can be used to dye acrylonitrile polymer textile material.

EXAMPLE 54

The dye (0.1 g.) is dissolved by warming in 5 cc. of 2-methoxyethanol. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of "Orlon 42" acrylic textile material, the dyeing is carried out at the boil for one hour. In the case of materials made of "Verel" modacrylic fiber the dye-bath temperature should not exceed 90° C. in order to avoid damage to the fiber. The dyed material is then washed well with water and dried.

The invention has been described in detail with particular reference to preferred embodiments thereof, but it will be understood that variations and modifications can be effected within the spirit and scope of the invention.

What is claimed is:

1. A 3-indenecarboxylic acid-1-methine compound having the structural formula

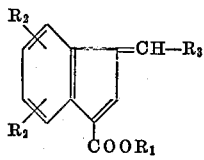

where $R_1$ is selected from the group consisting of a hydrogen atom, a lower alkyl group and a phenyl or lower alkyl substituted phenyl group;

$R_2$ is selected from the group consisting of a hydrogen atom, a lower alkyl group and a lower alkoxy group; and $R_3$ is an aromatic moiety selected from the group consisting of (1) a naphthalene group substituted with substituents selected from the group consisting of nitro groups, chloro groups, hydroxy groups, lower alkyl groups, lower alkoxy groups and lower dialkylamino groups;

(2) a heterocyclic group selected from the group consisting of pyrryl, pyridyl, indolinyl, and furfuryl; and (3) an aromatic group represented by the structure

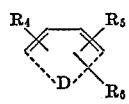

where D is selected from the group consisting of

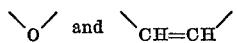

$R_4$ and $R_5$ are each selected from the group consisting of a hydrogen atom, a halogen atom, a lower alkyl group, a lower alkoxy group, a lower dialkylamino groups, a heterocyclic group selected from the group consisting of pyrrolidino groups, piperidino groups and morpholino groups; $R_6$ is selected from the group consisting of a 1-methylidyne-3-indinecarboxylate group represented by the structural formula

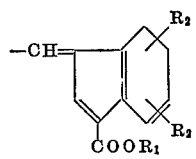

where $R_1$ and $R_2$ are as defined above, and a group represented by the formula

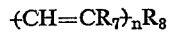

where $n$ is 0 or 1; $R_7$ is a hydrogen atom or a cyano group, and $R_8$ is a heterocyclic dye nucleus selected from the group consisting of thiazoline, thiazole, benzoxazole, benzothiazole, β-naphthothiazole, dimethylindolenine, quinoline and benzimidazole nuclei or a carboxyl or carboxy ester group of the formula —$COOR_1$ where $R_1$ is as defined above.

2. A 1-arylmethylene-3-indenecarboxylate having the structural formula

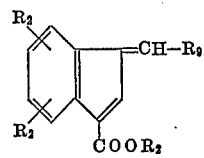

wherein $R_1$ is selected from the group consisting of a hydrogen atom, a lower alkyl group and a phenyl or lower alkyl substituted phenyl group; and $R_2$ is selected from the group consisting of a hydrogen atom, a lower alkyl group and a lower alkoxy group and $R_9$ is a naphthalene group substituted with substituents selected from the group consisting of nitro groups, chloro groups, hydroxy groups, lower alkyl groups, lower alkoxy groups and lower dialkylamino groups, or a heterocyclic group selected from the group consisting of pyrryl, pyridyl, indolinyl and furfuryl.

3. A 1-furfurylidene indenecarboxylate having the structural formula

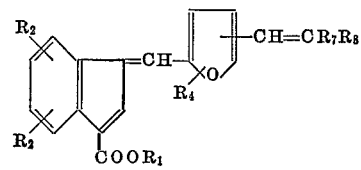

wherein $R_1$ is selected from the group consisting of a hydrogen atom, a lower alkyl group and phenyl or lower alkyl substituted phenyl group;

$R_2$ is selected from the group consisting of a hydrogen atom, a lower alkyl group and a lower alkoxy group;

$R_4$ is selected from the group consisting of a hydrogen atom, a halogen atom, a lower alkyl group, a lower alkoxy group, a lower dialkylamino group and a heterocyclic group selected from the group consisting of pyrrolidino, piperidino and morpholino;

$R_7$ is a hydrogen atom or a cyano group and $R_8$ is a heterocyclic dye nucleus selected from the group consisting of thiazoline, thiazole, benzoxazole, benzothiazole, β-naphthothiazole, dimethylindolenine, quinoline and benzimidazole nuclei or a carboxyl or carboxy ester group of the formula —$COOR_1$ where $R_1$ is as defined above.

4. A 1-benzylidene 3-indenecarboxylate having the structural formula

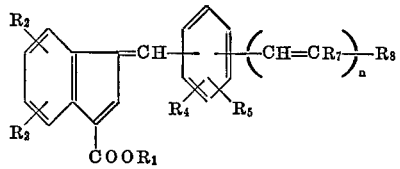

where $n = 0$ or 1

$R_1$ is selected from the group consisting of a hydrogen atom, a lower alkyl group and phenyl or lower alkyl substituted phenyl group;

$R_2$ is selected from the group consisting of a hydrogen atom, a lower alkyl group and a lower alkoxy group;

$R_4$ and $R_5$ are as defined above;

$R_7$ is a hydrogen atom or a cyano group; and $R_8$ is a heterocyclic dye nucleus selected from the group consisting of thiazoline, thiazole, benzoxazole, benzothiazole, β-naphthothiazole, dimethylindolenine, quinoline and benzimidazole nuclei or a carboxy or carboxy ester group of the formula —$COOR_1$ where $R_1$ is as defined above.

5. A furylenedimethylidyne-1,1'-bis(3 - indene-carboxylate) having the structural formula

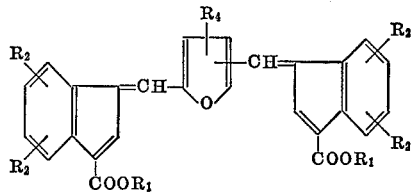

where $R_1$ is selected from the group consisting of a hydrogen atom, a lower alkyl group and phenyl or lower alkyl substituted phenyl group;

$R_2$ is selected from the group consisting of a hydrogen atom, a lower alkyl group, and a lower alkoxy group and $R_4$ is selected from the group consisting of a hydrogen atom, a halogen atom, a lower alkyl group, a lower alkoxy group, a lower dialkylamino group and a heterocyclic group selected from the group consisting of pyrrolidino and morpholino.

6. A prenylene dimethylidyne-1,1'-bis(3-indenecarboxylate) having the structural formula

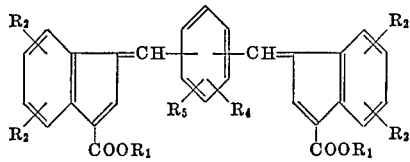

where $R_1$ is selected from the group consisting of a hydrogen atom, a lower alkyl group and phenyl or lower alkyl substituted phenyl group;

$R_2$ is selected from the group consisting of a hydrogen atom, a lower alkyl group and a lower alkoxy group; and $R_4$ and $R_5$ are selected from the group consisting of a hydrogen atom, a halogen atom, a lower alkyl group, a lower alkoxy group, a lower dialkylamino group and a heterocyclic group selected from the group consisting of pyrrolidino, piperidino and morpholino.

7. A compound as defined in claim 3 wherein $R_1$ is a lower alkyl group, $R_2$, $R_4$ and $R_7$ are hydrogen atoms, and $R_8$ is a heterocyclic dye nucleus selected from the group consisting of thiazoline, thiazole, benzoxazole, benzothiazole, β-naphthothiazole, dimethylindoline, quinoline and benzimidazole nuclei or a carboxy or carboxy ester group of the formula —$COOR_1$ where $R_1$ is as defined above.

8. A compound as defined in claim 4 wherein $R_1$ is a lower alkyl group, $R_2$, $R_4$, $R_5$ and $R_7$ are hydrogen atoms and $R_8$ is a heterocyclic dye nucleus selected from the group consisting of thiazoline, thiazole, benzoxazole, benzothiazole, β-naphthothiazole, dimethylindolenine, quinoline and benzimidazole nuclei or a carboxy or carboxy ester group of the formula —$COOR_1$ where $R_1$ is as defined above.

9. A compound as defined in claim 5 wherein $R_1$ s a lower alkyl group, and $R_2$ and $R_4$ are halogen atoms.

10. A compound as defined in claim 6 wherein $R_1$ is a lower alkyl group and $R_2$, $R_4$ and $R_5$ are hydrogen atoms.

11. Dimethyl 1,4-phenylenedimethylidine-1,1'-bis(3-indenecarboxylate).

12. Dimethyl 1,3-phenylenedimethylidine-1,1'-bis(3-indenecarboxylate).

13. 2 - (2 - [2 - (3 - methoxycarbonyl - 1 - indenylidenemethyl) - fur - 5 - yl]ethylidene) - 3 - ethylbenzothiazolium iodide.

14. Ethyl 5-(3 - methoxycarbonyl-1-indenylidenemethyl) furfurylidenecyanoacetate.

References Cited

UNITED STATES PATENTS 3,627,732   12/1971   Ford et al. .......... 260—75 U

OTHER REFERENCES

Wislicenus et al.: Annalen der Chemie, vol. 436, pp. 9, 16–17, 25–26 and 28–29 (1924).

JOHN D. RANDOLPH, Primary Examiner

U.S. Cl. X.R.

8—54.2, 177 R, 178 R, 179; 260—240 D, 468 R, 515 R, 520